(12) United States Patent
Suzuki et al.

(10) Patent No.: US 10,607,644 B2
(45) Date of Patent: Mar. 31, 2020

(54) MAGNETIC TAPE, MANUFACTURING METHOD OF MAGNETIC TAPE, MANUFACTURING DEVICE OF MAGNETIC TAPE, AND RECORDING AND REPRODUCING SYSTEM

(71) Applicant: FUJIFILM CORPORATION, Minato-ku, Tokyo (JP)

(72) Inventors: Hodaka Suzuki, Kanagawa (JP); Yoichi Akano, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/414,764

(22) Filed: May 16, 2019

(65) Prior Publication Data

US 2019/0362751 A1 Nov. 28, 2019

(30) Foreign Application Priority Data

May 28, 2018 (JP) .................. 2018-101758

(51) Int. Cl.
| | | |
|---|---|---|
| G11B 5/58 | (2006.01) |
| G11B 5/588 | (2006.01) |
| G11B 5/84 | (2006.01) |
| G11B 5/02 | (2006.01) |
| G11B 5/008 | (2006.01) |

(52) U.S. Cl.
CPC .......... G11B 5/588 (2013.01); G11B 5/00817 (2013.01); G11B 5/02 (2013.01); G11B 5/84 (2013.01)

(58) Field of Classification Search
CPC ..... G11B 15/43; G11B 15/48; G11B 2220/90; G11B 5/008; G11B 5/00813; G11B 5/02; G11B 15/093; G11B 15/54; G11B 20/1201; G11B 2020/1265; G11B 5/584; G11B 2020/1281; G11B 2020/1287
USPC ................................ 360/49, 48, 72.2, 73.04
See application file for complete search history.

(56) References Cited

U.S. PATENT DOCUMENTS

| | | | | |
|---|---|---|---|---|
| 7,355,805 B2 * | 4/2008 | Nakao | ............... | G11B 5/00813 360/48 |
| 9,514,769 B2 * | 12/2016 | Cherubini | .......... | G11B 5/00826 |
| 2005/0280920 A1 * | 12/2005 | Bui | ........................ | G11B 5/584 360/77.12 |

FOREIGN PATENT DOCUMENTS

JP 2016-48852 A 4/2016

* cited by examiner

*Primary Examiner* — Nabil Z Hindi
(74) *Attorney, Agent, or Firm* — Solaris Intellectual Property Group, PLLC

(57) ABSTRACT

A magnetic tape includes: a servo band on which servo patterns are repeatedly formed in a longitudinal direction thereof, each of the servo patterns including a first magnetization region formed to be tilted with respect to a width direction of the servo band by a predetermined angle along the width direction of the servo band, and a second magnetization region not parallel to the first magnetization region along the width direction of the servo band, wherein at least one of the first magnetization region or the second magnetization region is formed by decreasing the number of linear patterns from a predetermined plural number of linear patterns and changing a position of the linear pattern to be removed, in accordance with information that is an embedding target so that the information is embedded.

14 Claims, 17 Drawing Sheets

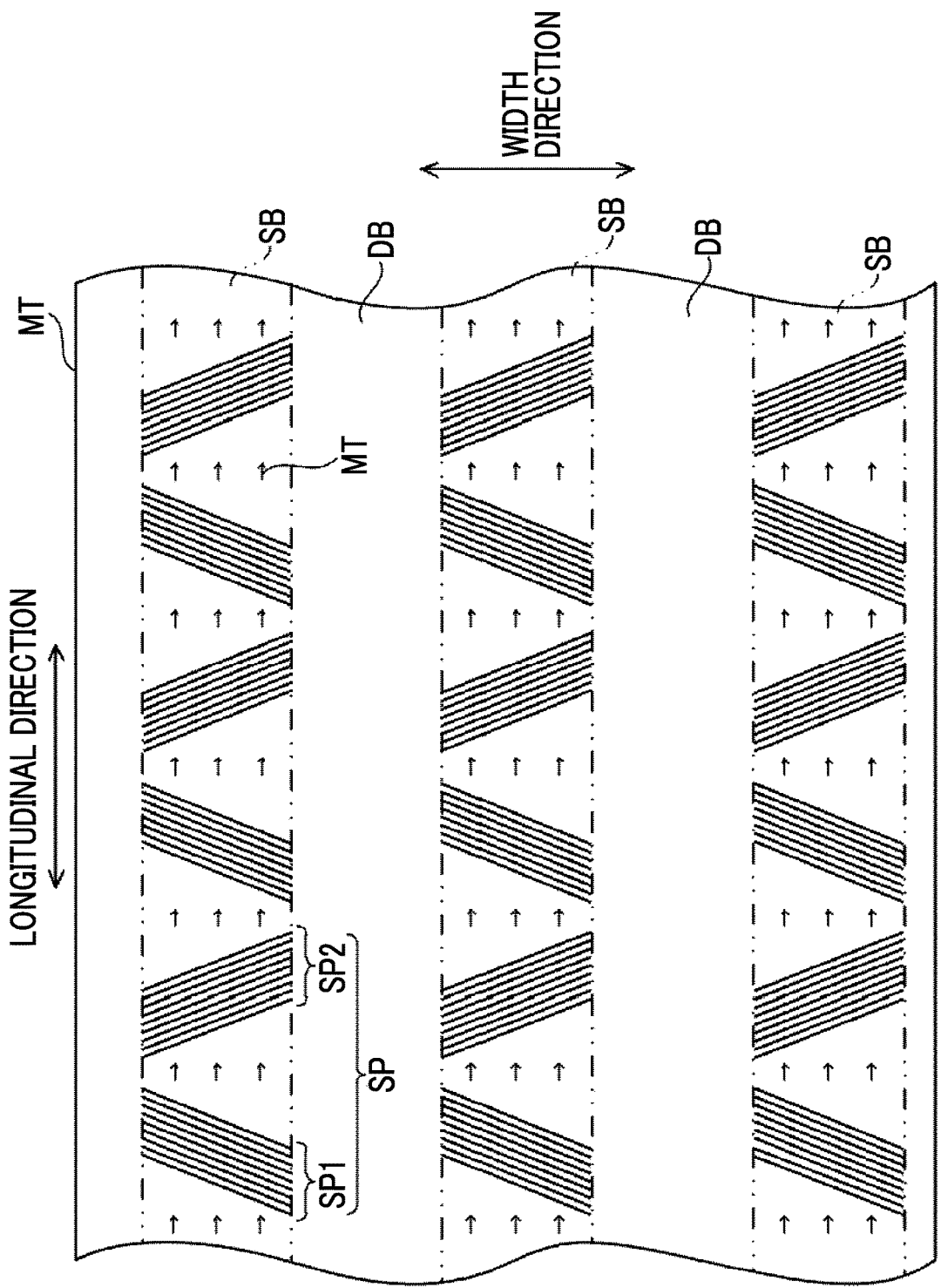

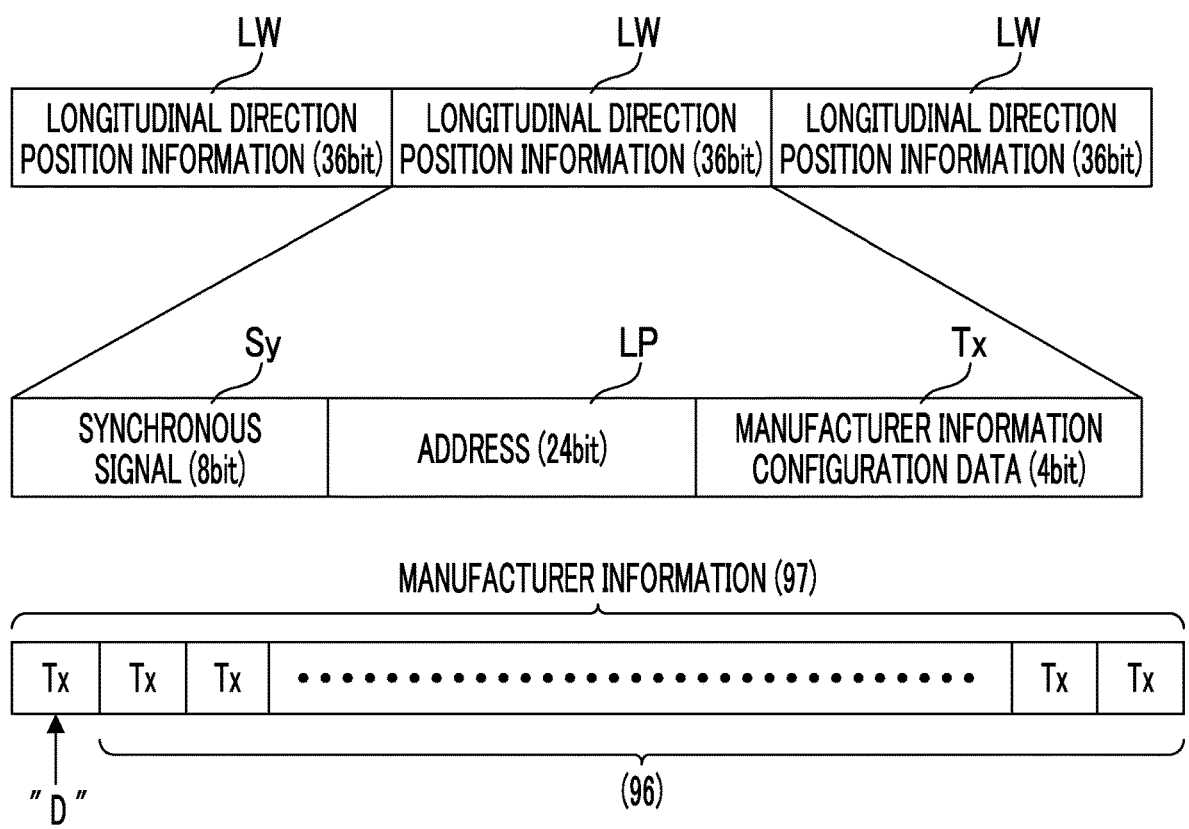

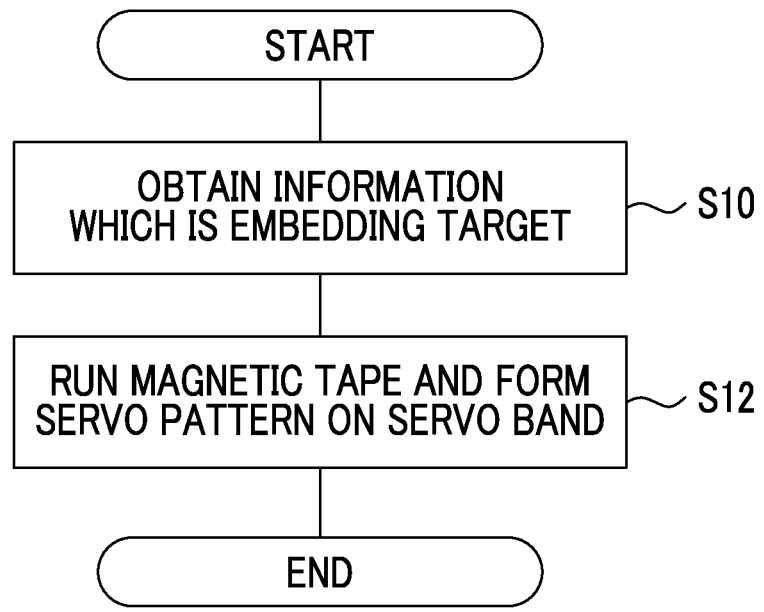
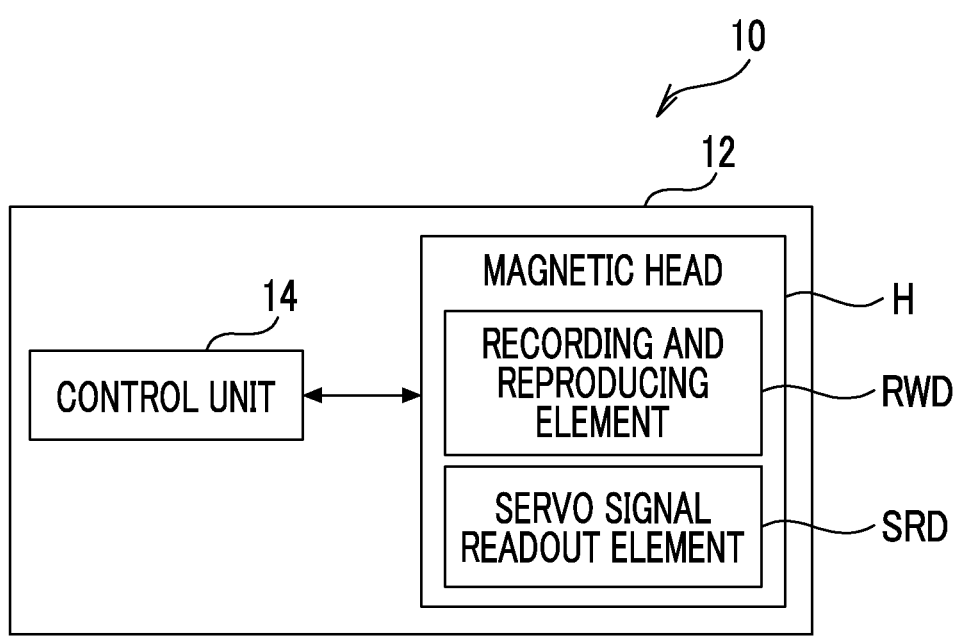

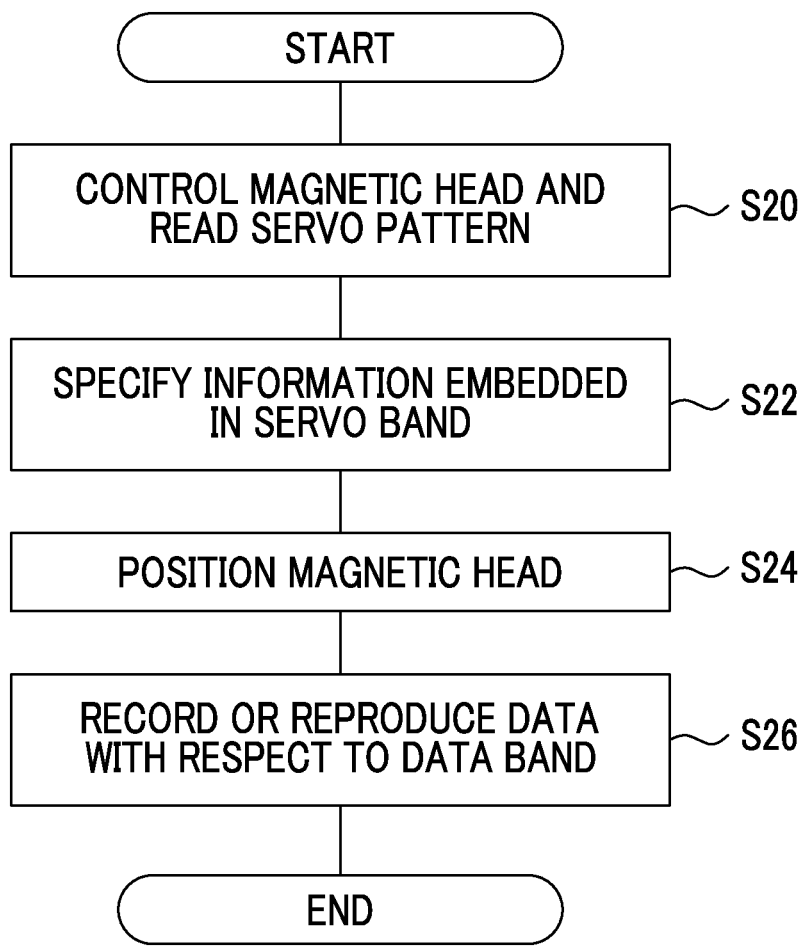

MAGNETIC TAPE, MANUFACTURING METHOD OF MAGNETIC TAPE, MANUFACTURING DEVICE OF MAGNETIC TAPE, AND RECORDING AND REPRODUCING SYSTEM

CROSS-REFERENCE TO RELATED APPLICATION

This application claims priority from Japanese Patent Application No. 2018-101758, filed on May 28, 2018, the disclosure of which is incorporated by reference herein in its entirety.

BACKGROUND

Field of the Invention

The present disclosure relates to a magnetic tape, a manufacturing method of a magnetic tape, a manufacturing device of a magnetic tape, and a recording and reproducing system.

Related Art

In related art, a servo pattern is written on a magnetic tape, in order to cause a recording and reproducing element of a magnetic head to follow a data track of the magnetic tape on which magnetic information is recorded. As this writing system of the servo pattern on the magnetic tape, a timing-based system is known.

As a technology regarding this timing-based system, JP2016-048852A discloses a technology of embedding information of "1" or "0" in a servo band by changing the number of linear patterns included in the servo pattern to have a set of five linear patterns or a set of four linear patterns.

In the technology of changing the number of linear patterns included in the servo pattern described above, only information of 1 bit can be embedded in one servo pattern, and accordingly, the amount of information embedded in the servo band is small.

SUMMARY

This disclosure is made in consideration of these circumstances and an object thereof is to provide a magnetic tape capable of increasing the amount of information embedded in a servo band, a manufacturing method of a magnetic tape, a manufacturing device of a magnetic tape, and a recording and reproducing system.

In order to achieve the aforementioned object, there is provided a magnetic tape of the disclosure, in which servo patterns, each including a first magnetization region formed to be tilted with respect to a width direction of a servo band by a predetermined angle along the width direction of the servo band and a second magnetization region not parallel to the first magnetization region along the width direction of the servo band, are repeatedly formed in a longitudinal direction of the servo band, and at least one of the first magnetization region or the second magnetization region is formed by decreasing the number of linear patterns from a predetermined plural number of linear patterns and changing a position of the linear pattern to be removed, in accordance with information which is an embedding target so that the information is embedded.

In the magnetic tape of the present disclosure, the at least one of the first magnetization region or the second magnetization region may be formed by decreasing the number of linear patterns from the plural number of the linear patterns except a linear pattern at a position of a leading portion along the longitudinal direction, to embed the information.

In the magnetic tape of the present disclosure, the at least one of the first magnetization region or the second magnetization region may be formed by decreasing the number of linear patterns from the plural number of the linear patterns except a linear pattern at a position of a tailing portion along the longitudinal direction to embed information.

In order to achieve the aforementioned object, there is provided a manufacturing method of a magnetic tape of the disclosure in which servo patterns, each including a first magnetization region formed to be tilted with respect to a width direction of a servo band by a predetermined angle along the width direction of the servo band and a second magnetization region not parallel to the first magnetization region along the width direction of the servo band, are repeatedly formed in a longitudinal direction of the servo band, the method comprising: forming at least one of the first magnetization region or the second magnetization region by decreasing the number of linear patterns from a predetermined plural number of linear patterns and changing a position of the linear pattern to be removed, in accordance with the information which is an embedding target to embed the information.

In order to achieve the aforementioned object, there is provided a manufacturing device of a magnetic tape of the disclosure in which servo patterns, each including a first magnetization region formed to be tilted with respect to a width direction of a servo band by a predetermined angle along the width direction of the servo band and a second magnetization region not parallel to the first magnetization region along the width direction of the servo band, are repeatedly formed in a longitudinal direction of the servo band, the device comprising: a servo recording element which embeds information by forming at least one of the first magnetization region or the second magnetization region by decreasing the number of linear patterns from a predetermined plural number of linear patterns and changing a position of the linear pattern to be removed, in accordance with the information which is an embedding target.

In order to achieve the aforementioned object, there is provided a recording and reproducing system of the disclosure comprising: a servo signal readout element which reads a servo pattern formed on a servo band of a magnetic tape in which servo patterns, each including a first magnetization region formed to be tilted with respect to a width direction of a servo band by a predetermined angle along the width direction of the servo band and a second magnetization region not parallel to the first magnetization region along the width direction of the servo band, are repeatedly formed in a longitudinal direction of the servo band, and at least one of the first magnetization region or the second magnetization region is formed by decreasing the number of linear patterns from a predetermined plural number of linear patterns and changing a position of the linear pattern to be removed, in accordance with information which is an embedding target so that the information is embedded; and a specification unit which specifies the embedded information in accordance with the number of linear patterns of the servo pattern read by the servo signal readout element and the position of the removed linear pattern.

In order to achieve the aforementioned object, there is provided a magnetic tape of the disclosure, in which servo patterns, each including a first magnetization region formed to be tilted with respect to a width direction of a servo band by a predetermined angle along the width direction of the servo band and a second magnetization region not parallel to the first magnetization region along the width direction of the servo band, are repeatedly formed in a longitudinal direction of the servo band, and at least one of the first magnetization region or the second magnetization region is formed by changing a width of at least one linear pattern of a predetermined plural number of linear patterns to be different from the other linear patterns and changing a position of the linear pattern having a width to be changed, in accordance with information which is an embedding target so that the information is embedded.

In order to achieve the aforementioned object, there is provided a manufacturing method of a magnetic tape of the disclosure in which servo patterns, each including a first magnetization region formed to be tilted with respect to a width direction of a servo band by a predetermined angle along the width direction of the servo band and a second magnetization region not parallel to the first magnetization region along the width direction of the servo band, are repeatedly formed in a longitudinal direction of the servo band, the method comprising: forming at least one of the first magnetization region or the second magnetization region by changing a width of at least one linear pattern of a predetermined plural number of linear patterns to be different from the other linear patterns and changing a position of the linear pattern having a width to be changed, in accordance with information which is an embedding target to embed the information.

In order to achieve the aforementioned object, there is provided a manufacturing device of a magnetic tape of the disclosure in which servo patterns, each including a first magnetization region formed to be tilted with respect to a width direction of a servo band by a predetermined angle along the width direction of the servo band and a second magnetization region not parallel to the first magnetization region along the width direction of the servo band, are repeatedly formed in a longitudinal direction of the servo band, the device comprising: a servo recording element which embeds information by forming at least one of the first magnetization region or the second magnetization region by changing a width of at least one linear pattern of a predetermined plural number of linear patterns to be different from the other linear patterns and changing a position of the linear pattern having a width to be changed, in accordance with the information which is an embedding target.

In order to achieve the aforementioned object, there is provided a recording and reproducing system of the disclosure comprising: a servo signal readout element which reads a servo pattern formed on a servo band of a magnetic tape in which servo patterns, each including a first magnetization region formed to be tilted with respect to a width direction of the servo band by a predetermined angle along the width direction of the servo band and a second magnetization region not parallel to the first magnetization region along the width direction of the servo band, are repeatedly formed in a longitudinal direction of the servo band, and at least one of the first magnetization region or the second magnetization region is formed by changing a width of at least one linear pattern of a predetermined plural number of linear patterns to be different from the other linear patterns and changing a position of the linear pattern having a width to be changed, in accordance with information which is an embedding target so that the information is embedded; and a specification unit which specifies the embedded information in accordance with the position of the linear pattern having the changed width of the servo pattern read by the servo signal readout element.

According to the disclosure, it is possible to increase the amount of information embedded in the servo band.

BRIEF DESCRIPTION OF THE DRAWINGS

FIG. 1A is a plan view showing an example of a magnetization region formed in a servo band of a magnetic tape according to the embodiment.

FIG. 5 is a view showing an example of a data structure of information embedded in the servo band according to the embodiment.

FIG. 7 is a flowchart showing an example of a servo pattern formation process according to the embodiment.

FIG. 8 is a block view showing an example of a configuration of a recording and reproducing system according to the embodiment.

FIG. 9 is a flowchart showing an example of a recording and reproducing process according to the embodiment.

DETAILED DESCRIPTION

Hereinafter, embodiments for implementing technologies of the disclosure will be described in detail with reference to the drawings.

Figure 1B:
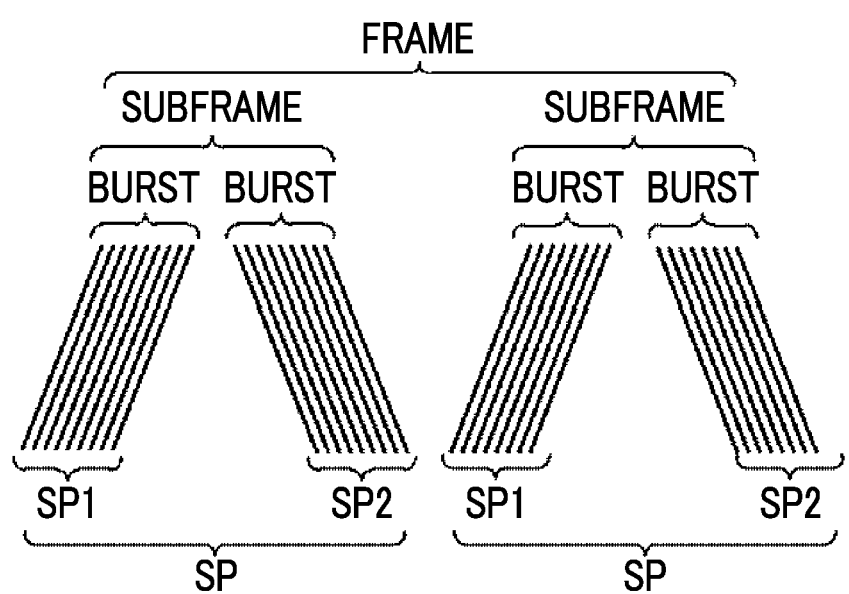
FIG. 1B is a plan view for describing bursts, subframes, and a frame according to the embodiment.

First, a configuration of a magnetic tape MT according to the embodiment will be described with reference to FIGS. 1A and 1B. As shown in FIG. 1A, in the magnetic tape MT, three servo bands SB are formed along a longitudinal direction of the magnetic tape MT. In addition, the three servo bands SB are formed so as to be arranged in a width direction of the magnetic tape MT at an equivalent interval. Hereinafter, the longitudinal direction simply written means the longitudinal direction of the magnetic tape MT (servo band SB) and the width direction simply written means the width direction of the magnetic tape MT (servo band SB).

Data bands DB are respectively formed between the three servo bands SB. In the data band DB, a plurality of data tracks DT (see FIG. 2A) for recording magnetic information are formed along a longitudinal direction so as to be arranged in the width direction. The number of servo bands SB and the data bands DB is not limited to the example shown in FIG. 1A. For example, the number of servo bands SB may be 5 and the number of data bands DB may be 4.

The servo bands SB is a portion in which the servo patterns SP are formed, and the magnetization direction M1 thereof is directed in one direction of the magnetic tape MT (for example, direction opposite to the running direction of the magnetic tape MT), so that the servo band SB is magnetized with direct current.

In the servo band SB, the servo patterns SP for performing positioning of a magnetic head H (see FIG. 2A) are repeatedly formed in the longitudinal direction. The servo pattern SP is configured to include a first magnetization region SP1 and a second magnetization region SP2.

The first magnetization region SP1 is formed to be tilted with respect to the width direction by a predetermined angle along the width direction. This angle is also referred to as an azimuth angle.

As shown in FIG. 1A, the second magnetization region SP2 is formed so as not to be parallel to the first magnetization region SP1 along the width direction. In the embodiment, the second magnetization region SP2 is formed so as to be linearly symmetrical to the first magnetization region SP1, with respect to a linear line along the width direction. Hereinafter, as shown in FIG. 1B, one first magnetization region SP1 and one second magnetization region SP2 are referred to as "bursts", one servo pattern SP is referred to as a "subframe", and a combination of two continuous servo patterns SP is referred to as a "frame".

Next, a process of positioning the magnetic head H with respect to the width direction of the magnetic tape MT on which the servo pattern SP is formed will be described with reference to FIGS. 2A and 2B.

Figure 2A:
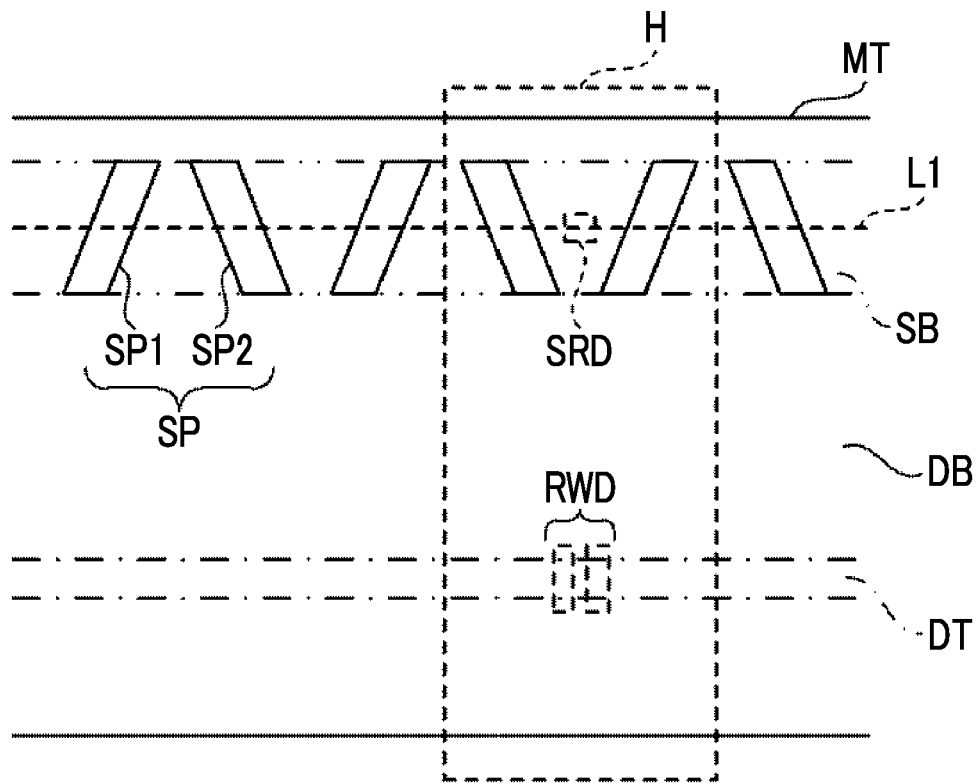
FIG. 2A is a plan view for describing a positioning process of a magnetic head according to the embodiment.
Figure 2B:
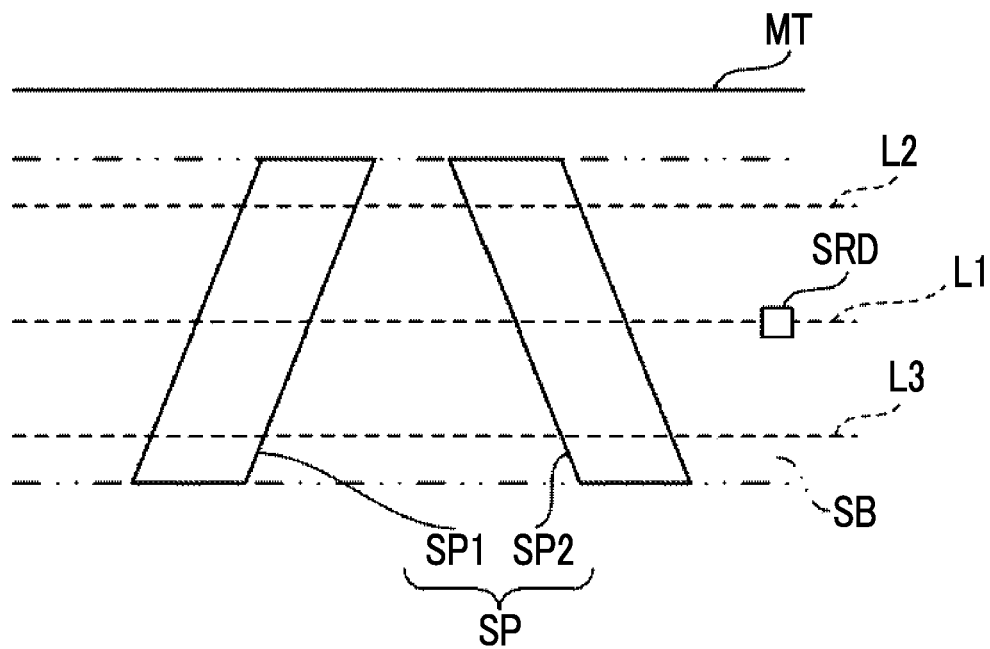
FIG. 2B is a plan view for describing the positioning process of the magnetic head according to the embodiment.

As shown in FIG. 2A, the magnetic head H according to the embodiment includes a servo signal readout element SRD which reads out and reproduces the servo pattern SP recorded on the servo band SB, and a recording and reproducing element RWD which performs recording and reproducing of information with respect to the data track DT. Hereinafter, the position of the magnetic head H, the position of the servo signal readout element SRD, and the position of the recording and reproducing element RWD, which are simply noted, respectively mean positions along the width direction of the magnetic tape MT.

In the magnetic tape MT according to the embodiment, in a case where the magnetic tape MT runs in a predetermined running direction (for example, right to left direction in FIGS. 2A and 2B), the servo signal readout element SRD of the magnetic head H is positioned at a predetermined position in a width direction, thereby positioning the magnetic head H with respect to the magnetic tape MT. In the embodiment, for example, in a case where the servo signal readout element SRD of the magnetic head H traces a center line L1 of the servo band SB, the recording and reproducing element RWD of the magnetic head H follows a predetermined data track DT formed in the data band DB.

In a case where the first magnetization region SP1 and the second magnetization region SP2 pass through a position of the detection performed by the servo signal readout element SRD, the servo signal readout element SRD detects the first magnetization region SP1 and the second magnetization region SP2. In this case, the servo signal readout element SRD detects the first magnetization region SP1 and the second magnetization region SP2 at a certain timing, as long as the center line L1 of the servo band SB is traced.

Meanwhile, in a case where the position of the servo signal readout element SRD is displaced so as to trace a line of a linear line L2 on the servo band SB, a time interval for detecting the respective first magnetization region SP1 and the second magnetization region SP2 by the servo signal readout element SRD becomes narrow. This is because the first magnetization region SP1 is tilted with respect to the width direction. In addition, in a case where the position of the servo signal readout element SRD is displaced so as to trace a line of a linear line L3 on the servo band SB, a time interval for detecting the respective first magnetization region SP1 and the second magnetization region SP2 by the servo signal readout element SRD becomes wide.

In the magnetic tape MT on which the servo pattern SP is recorded, the magnetic head H is positioned at a position so that the timing for detecting the first magnetization region SP1 and the second magnetization region SP2 by the servo signal readout element SRD is set as a predetermined value. Accordingly, the recording and reproducing element RWD of the magnetic head H follows a predetermined data track DT.

Next, a method of embedding information in the servo band SB according to the embodiment will be described with reference to FIG. 3.

Figure 3:
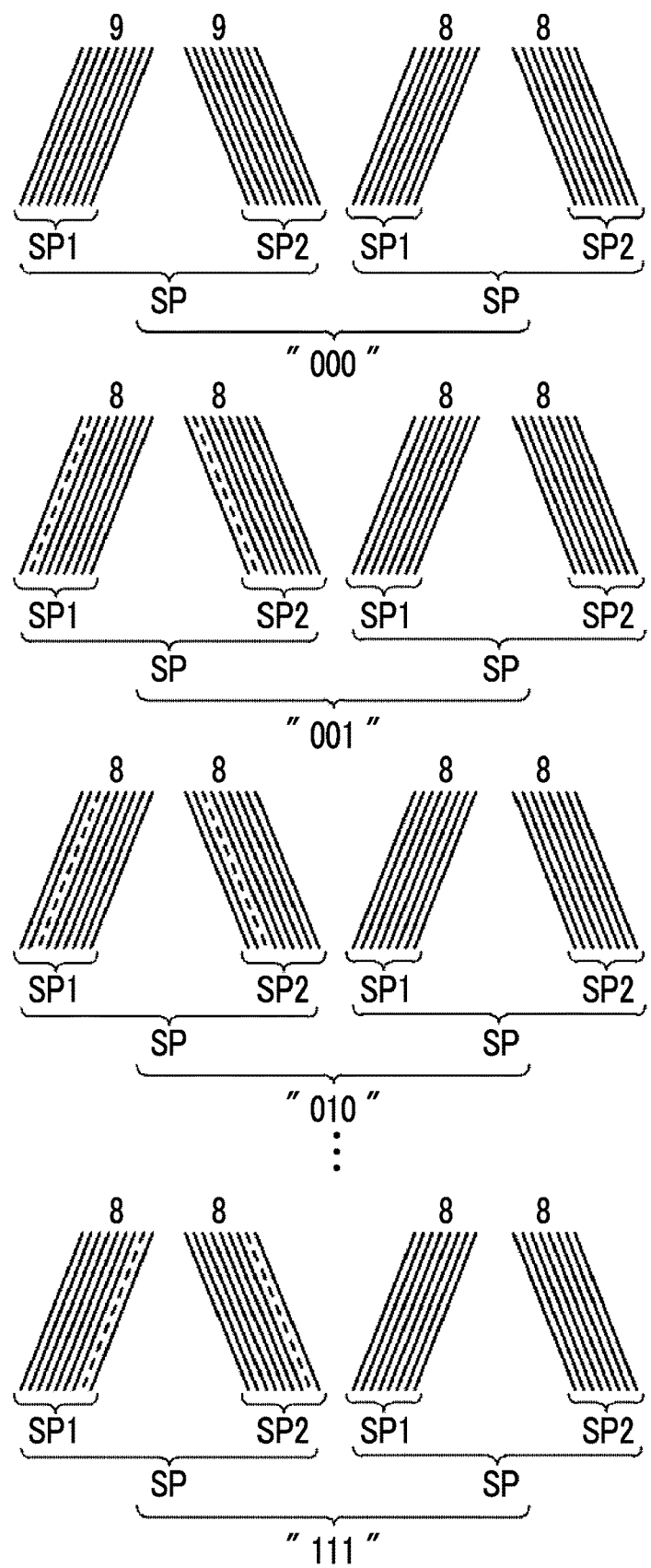
FIG. 3 is a view for describing an example of a method of embedding information in the servo band according to the embodiment.

As shown in FIG. 3, in the embodiment, linear patterns of the first magnetization region SP1 and the second magnetization region SP2 of the first servo pattern SP (subframe) among the two servo patterns SP of each frame are formed by decreasing the number thereof by 1 from the predetermined number thereof (in the embodiment, 9), in accordance with information which is an embedding target in the servo band SB.

IN the embodiment, the first magnetization region SP1 and the second magnetization region SP2 are formed by changing the position of the linear pattern to be removed, in accordance with information which is the embedding target. In the example shown in FIG. 3, in order for easy recognition of the removed linear pattern, the removed linear pattern is shown with a broken line. As shown in FIG. 3, in the embodiment, in a case of removing the linear pattern, the linear patterns at corresponding positions in the first magnetization region SP1 and the second magnetization region SP2 included in the same servo pattern SP are removed.

In addition, in the embodiment, in a case removing the linear pattern, in each of the first magnetization region SP1 and the second magnetization region SP2, one linear pattern except the linear pattern at a position of a leading portion and the linear pattern at a position of a tailing portion along the longitudinal direction is removed.

For example, in a case where the linear pattern is not removed, a bit stream of "000" is allocated to the frame. For example, in a case where the second linear pattern is removed, a bit stream of "001" is allocated to the frame. For example, in a case where the third linear pattern is removed, a bit stream of "010" is allocated to the frame. As described above, by changing the number of linear patterns and the position of the linear pattern to be removed, it is possible to embed information of 3 bits in each frame.

Figure 4:
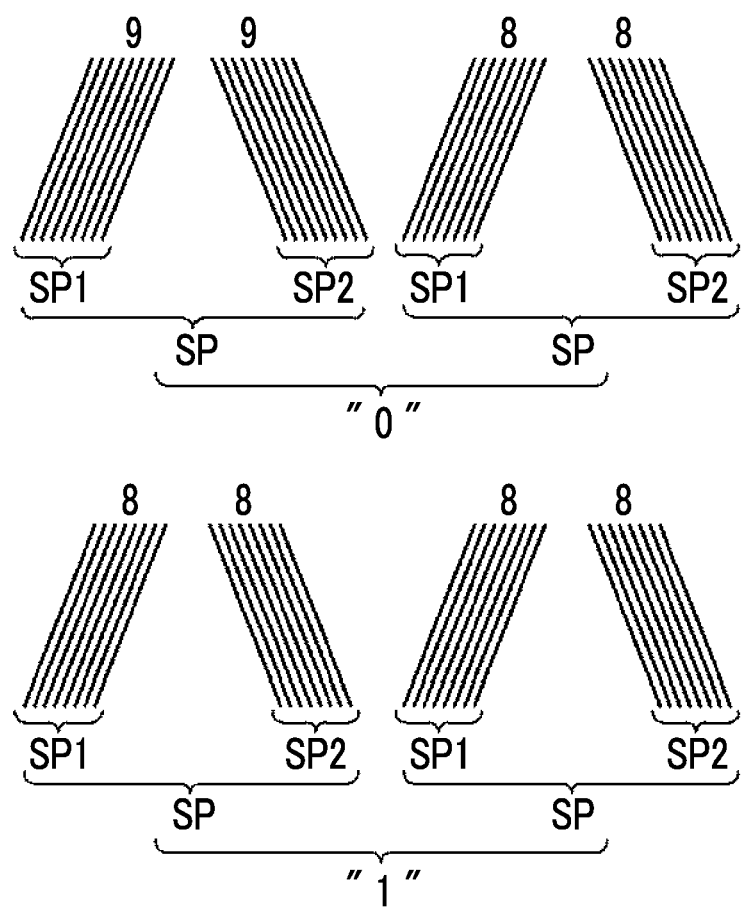
FIG. 4 is a view showing an example of a method of embedding information in the servo band by only changing the number of linear patterns.

With respect to this, in a technology of only changing the number of linear patterns, as an example shown in FIG. 4, only information of 1 bit of "0" or "1" can be allocated to each frame. Therefore, according to the embodiment, it is possible to increase the amount of information embedded in the servo band SB.

Next, a structure of data based on "ECMA-319 standard" will be described as an example of a data structure of information to be embedded in the servo band SB according to the embodiment with reference to FIG. 5.

As shown in FIG. 5, the data to be embedded in all of the servo band SB is configured to include the predetermined number of pairs (for example, 12 pairs) of servo patterns SP, that is, a plurality of longitudinal direction position information LW which is data of the predetermined number of bits (for example, 36 bits). The longitudinal direction position information LW is configured to include a synchronous signal Sy of 8 bit shown in the front, an address LP configured to include six data items of 4 bits showing the position in the longitudinal direction, and a manufacturer information configuration data Tx of 4 bits.

In addition, the manufacturer information configuration data Tx is data recognized as one manufacturer information MI by reading the predetermined number of (for example, 97) longitudinal direction position information items LW. In the configuration thereof, the data showing that is in the front (for example, data as "D" shown by converting data of 4 bits which is "0001" with a predetermined table) is written in the manufacturer information configuration data Tx in the front, and data other than "D" (for example, "0, 1, . . . , 9, A, B, and C") is randomly written in the subsequent 96 manufacturer information configuration data items Tx. The data showing a manufacturer ID, information regarding a date of manufacture of the magnetic tape MT, a serial number of the magnetic tape MT, a servo writer ID, and an operator IDentifier (ID) can also be embedded in these 96 manufacturer information configuration data items Tx. In addition, servo band information showing which servo band SB is shown among the plurality of servo bands SB, can also be embedded in these 96 manufacturer information configuration data items Tx.

Next, a configuration of a servo writer SW as an example of a manufacturing device of the magnetic tape MT which records the servo pattern SP on each servo band SB of the magnetic tape MT according to the embodiment will be described with reference to FIGS. 6A and 6B.

Figure 6A:
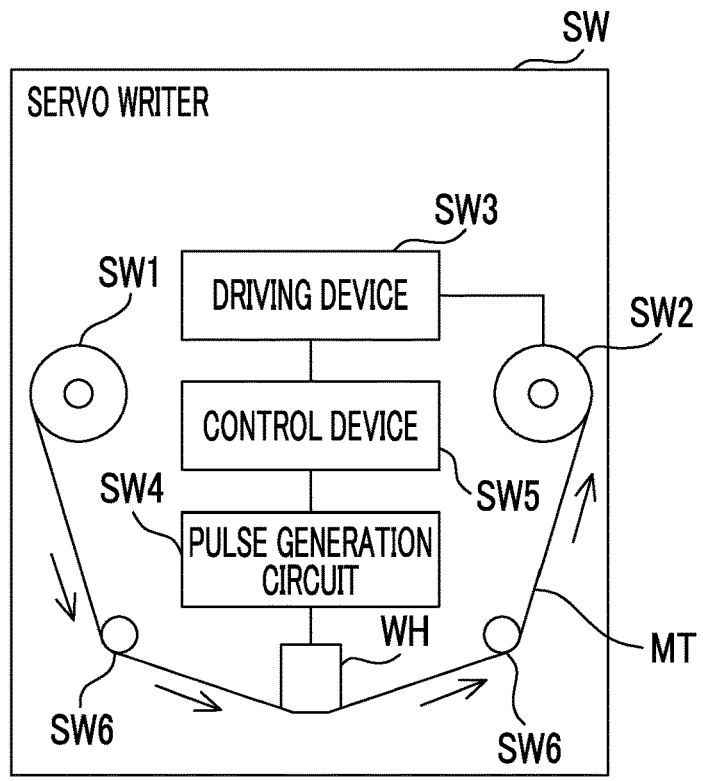
FIG. 6A is a view showing an example of a configuration of a servo writer according to the embodiment.

As shown in FIG. 6A, the servo writer SW comprises a sending reel SW1, a winding reel SW2, a driving device SW3, a pulse generation circuit SW4, a control device SW5, and a servo signal writing head WH. In addition, the servo writer SW also comprises a power device, a cleaning device which cleans the magnetic tape MT, a verifying device which performs inspection of the servo pattern SP recorded on the magnetic tape MT, and the like which are not shown.

In the sending reel SW1, the magnetic tape MT cut to have a product width from a raw web having a wide width, before writing the servo pattern SP is set on a pancake reel having a great diameter, and the magnetic tape MT is sent at the time of writing the servo pattern SP. The magnetic tape MT sent from the sending reel SW1 is guided to a guide SW6 and the like and transported to the servo signal writing head WH. The magnetic tape MT in which the servo pattern SP is recorded on each servo band SB with the servo signal writing head WH is guided to the guide SW6 and the like and transported to the winding reel SW2. The winding reel SW2 is rotatably driven by a driving device SW3, and the magnetic tape MT on which the servo pattern SP is recorded is wound up.

The driving device SW3 is a device for rotatably driving the winding reel SW2, and comprises a motor, a motor driving circuit for supplying a current to the motor, a gear for connecting a motor axis and the winding reel SW2, and the like. In the driving device SW3, a motor current is generated by the motor driving circuit based on a motor current signal from the control device SW5, this motor current is supplied to the motor, and a rotation driving force of the motor is transmitted to the winding reel SW2 through the gear to rotatably drive the winding reel SW2.

The pulse generation circuit SW4 is a circuit which supplies a recording pulse current to a plurality of coils C (see FIG. 6B) provided in the servo signal writing head WH based on the pulse control signal from the control device SW5, and is independently provided in each of the plurality of coils C. Specifically, the pulse generation circuit SW4 alternately generates a pulse current having positive polarity or negative polarity and a zero current, based on the pulse control signal from the control device SW5, and accordingly, the servo pattern SP is written in a predetermined position of each servo band SB. The recording pulse current is a current value sufficient for magnetizing the magnetic layer of the magnetic tape MT by a leakage flux from a gap pattern G (see FIG. 6B), and is set by considering properties of the coil C of the servo signal writing head WH.

Figure 6B:
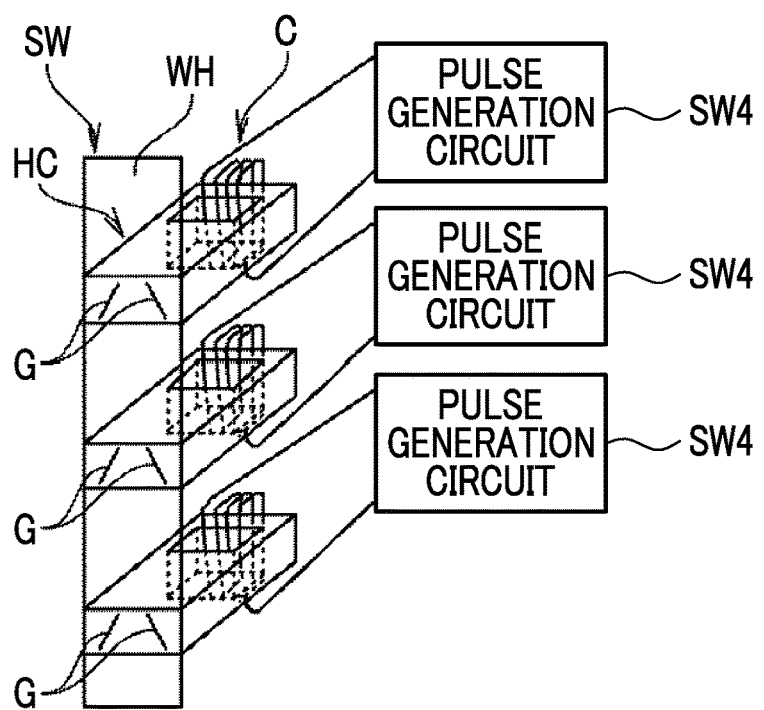
FIG. 6B is another view showing the example of the configuration of the servo writer according to the embodiment.

As shown in FIG. 6B, the servo signal writing head WH includes the linear gap pattern G formed at a position corresponding to each servo band SB, and the servo pattern SP is formed on the servo band SB with each gap pattern G. One linear pattern of the gap pattern G is tilted according to the angle of the first magnetization region SP1, and the other linear pattern is not parallel to the one linear pattern according to the second magnetization region SP2. The change of the first magnetization region SP1 and the second magnetization region SP2, and the linear pattern can be performed by changing the shape of this gap pattern G. The gap pattern G is an example of a servo recording element.

Regarding each gap pattern G arranged in the width direction at equivalent interval, the position in the width direction is strictly set, the position in the longitudinal direction may not be strictly set and may be lightly deviated from the position of the other gap pattern G. This is because that, even in a case where the servo patterns SP of the servo bands SB are formed to be deviated from each other with each gap pattern G deviated in the longitudinal direction, it is possible to specify the servo band SB by referring the servo pattern SP of one servo band SB. Accordingly, the offset gap pattern G may not be accurately formed in the servo signal writing head WH.

In addition, a head core HC is independent for each gap pattern G, and each coil C is wound around the head core HC. Each pulse generation circuit SW4 connected to each coil C converts the information which is an embedding target encoded by the control device SW5 into a pattern of the recording pulse current, and the recording pulse current is supplied to the coil C according to this pattern.

Next, an example of a flow of a servo pattern formation process of forming the servo pattern SP on the servo band SB of the magnetic tape MT will be described with reference to FIG. 7.

In a step S10 of FIG. 7, the control device SW5 obtains information which is the embedding target. The control device SW5 may obtain the information which is the embedding target from a storage unit comprised in the control device SW5 or may obtain the information from an external device through network.

In a step S12, the control device SW5 outputs a motor current signal to the driving device SW3 to run the magnetic tape MT. In addition, the control device SW5 supplies a recording pulse current of the pattern according to the information which is the embedding target obtained by the process of the step S10 to the coil C, to form the servo pattern SP according to the information which is the embedding target on the servo band SB. In a case where the process of the step S12 ends, the servo pattern formation process ends.

Next, as described above, a configuration of the recording and reproducing system 10 which performs the recording and reproducing of data with respect to the magnetic tape MT in which the servo pattern SP according to the information which is the embedding target is formed on the servo band SB, will be described with reference to FIG. 8.

As shown in FIG. 8, the recording and reproducing system 10 comprises a tape drive 12. On the tape drive 12, the magnetic tape cartridge including the magnetic tape MT is loaded. The tape drive 12 comprises a control unit 14 and the magnetic head H. The magnetic head H comprises a plurality of recording and reproducing elements RWD, and a plurality (in the embodiment, two) of servo signal readout elements SRD corresponding to each of the adjacent servo band SB. The control unit 14 includes a central processing unit (CPU), memory as a temporary storage, and a non-volatile storage unit.

Next, a flow of a recording and reproducing process of performing the recording and reproducing of data with respect to the magnetic tape MT by the recording and reproducing system 10 will be described with reference to FIG. 9.

In a step S20 of FIG. 9, the control unit 14 controls the magnetic head H while making the magnetic tape MT run, and causes the servo signal readout element SRD to read the servo pattern SP recorded on the servo band SB.

In a step S22, the control unit 14 specifies information embedded in the servo band SB in accordance with the number of linear patterns and the position, where the linear pattern is removed, of the servo pattern SP read by the process of the step S20. As an example shown in FIG. 10A, in a case where the number of linear patterns of the first magnetization region SP1 is not decreased, a first peak (in the example of FIG. 10A, upward convex peak), in a case where the end portion of the leading side of the linear pattern is read, and a second peak (in the example of FIG. 10A, downward convex peak), in a case where the end portion of the tailing side thereof is read, are repeatedly detected at a predetermined time interval. In this case, two peaks are detected by the number of times (in the embodiment, 9 times) corresponding to the predetermined number of linear patterns.

Figure 10A:
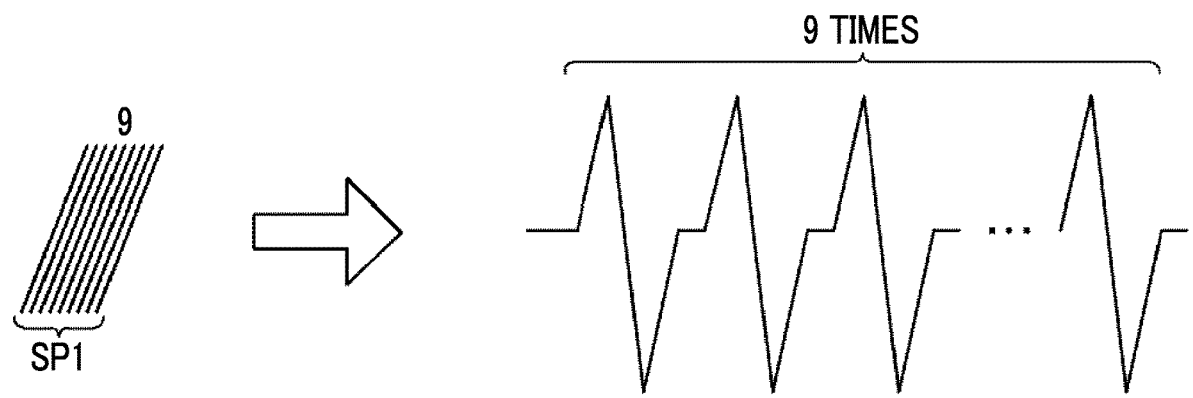
FIG. 10A is a view for describing a process of specifying information embedded in the servo band according to the embodiment.
Figure 10B:
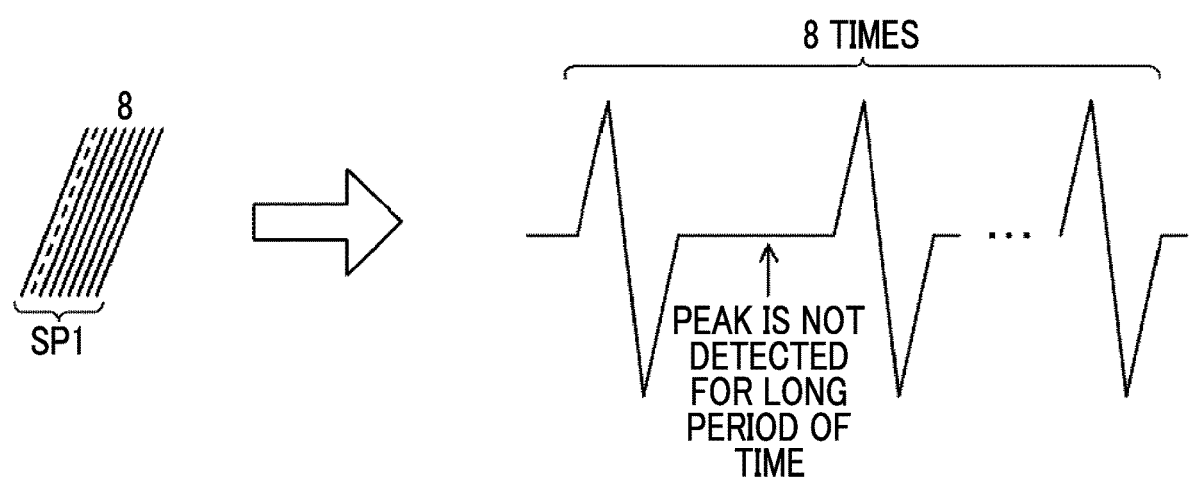
FIG. 10B is a view for describing the process of specifying information embedded in the servo band according to the embodiment.

Meanwhile, as an example shown in FIG. 10B, in a case where the number of linear patterns of the first magnetization region SP1 is decreased, a period of time from the time when the second peak is detected to the time when the first peak is detected in accordance with the position where the linear pattern is removed, is longer than that of the other position. In the example of FIG. 10B, the second linear pattern from the leading portion is removed, and accordingly, a period of time from the time when the first second peak is detected to the time when the subsequent first peak is detected is longer than that of the other position. In this case, two peaks are detected by the number of times (in the embodiment, 8 times) corresponding to the number obtained by subtracting the number of linear patterns to be removed from the predetermined number of linear patterns. In FIGS. 10A and 10B, the first magnetization region SP1 has been described as an example, but the same applies to the second magnetization region SP2.

Therefore, the control unit 14 can specify information embedded in the servo band SB by using the number of times the two peaks are detected, and the time interval from the time when the second peak is detected to the time when the first peak is detected, regarding each magnetization region. The control unit 14 functions as a specification unit by the process of the step S22.

In a step S24, the control unit 14 performs the positioning of the magnetic head H, based on the time interval between the timing when the linear pattern of the first magnetization region SP1 is read and the timing when the linear pattern of the corresponding second magnetization region SP2 is read, by the process of the step S20. In a step S26, the control unit 14 controls the magnetic head H and performs the recording or reproducing of data with respect to the data band DB. In a case where the process of the step S26 ends, the recording and reproducing process ends.

Hereinabove, as described above, according to the embodiment, the first magnetization region SP1 and the second magnetization region SP2 are formed by decreasing the number of linear patterns from the predetermined plural number of linear patterns and formed by changing the position where the linear pattern is removed, in according to the information which is the embedding target, and accordingly, the information is embedded. Therefore, it is possible to increase the amount of information embedded in the servo band SB.

Figure 11:
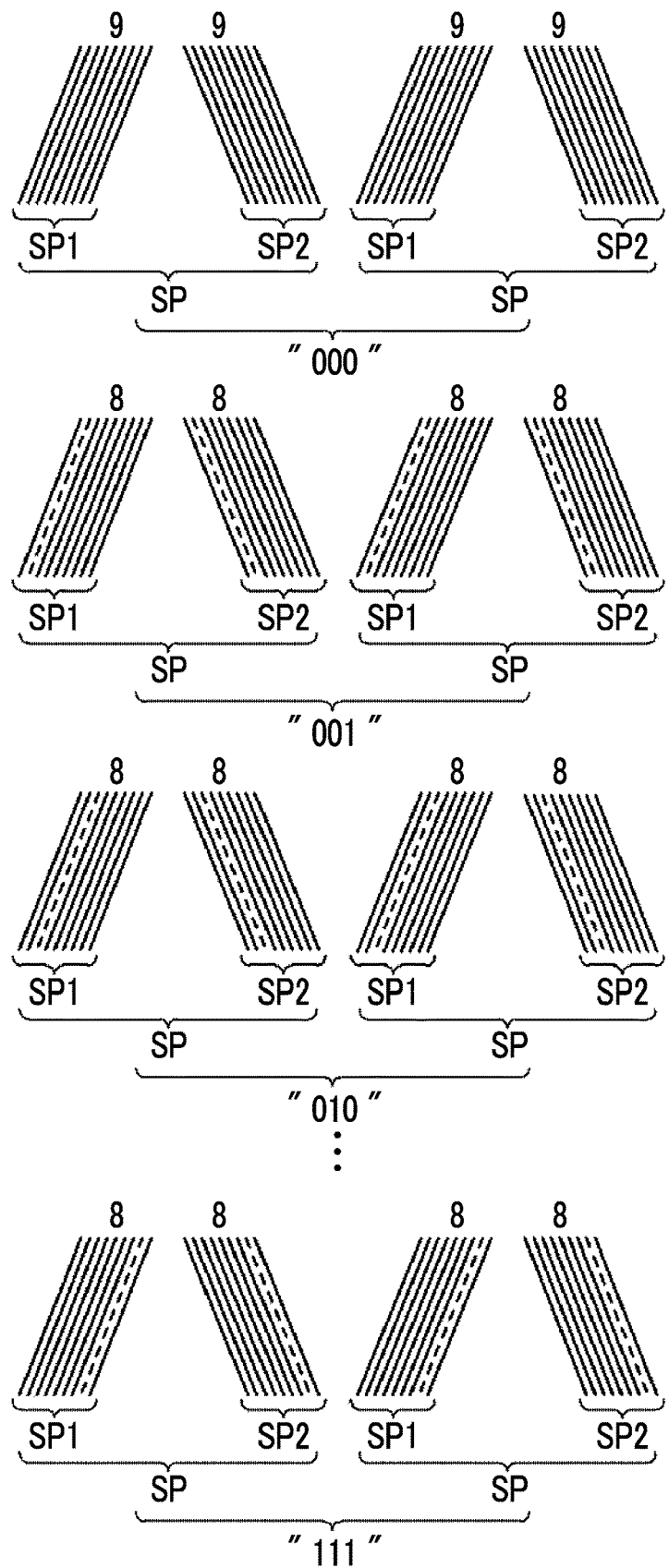
FIG. 11 is a view for describing an example of a method of embedding information in the servo band according to a modification example.

In the embodiment, the case where the number of linear patterns of one servo pattern SP of each frame is decreased has been described, but there is no limitation thereto. For example, as shown in FIG. 11, the number of linear patterns of both servo patterns SP of each frame may be decreased.

Figure 12:
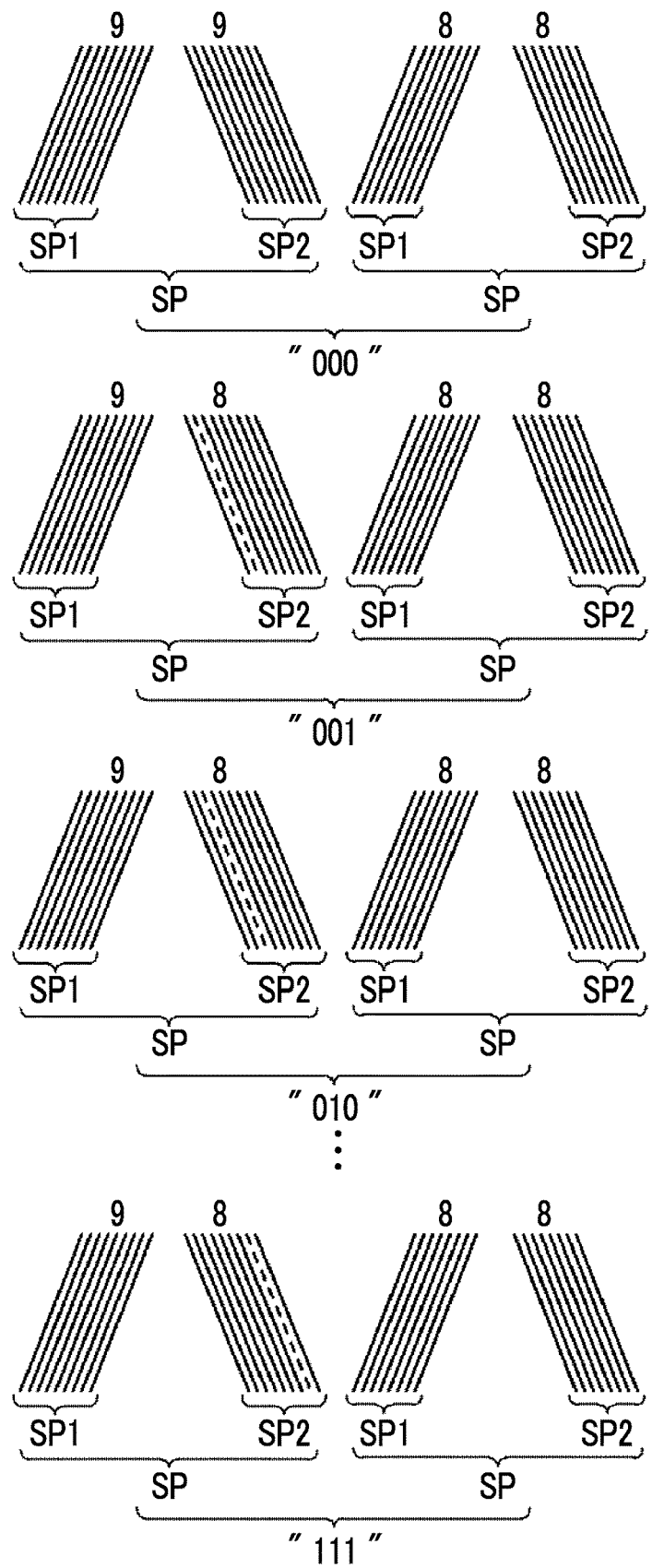
FIG. 12 is a view for describing an example of a method of embedding information in the servo band according to the modification example.
Figure 13:
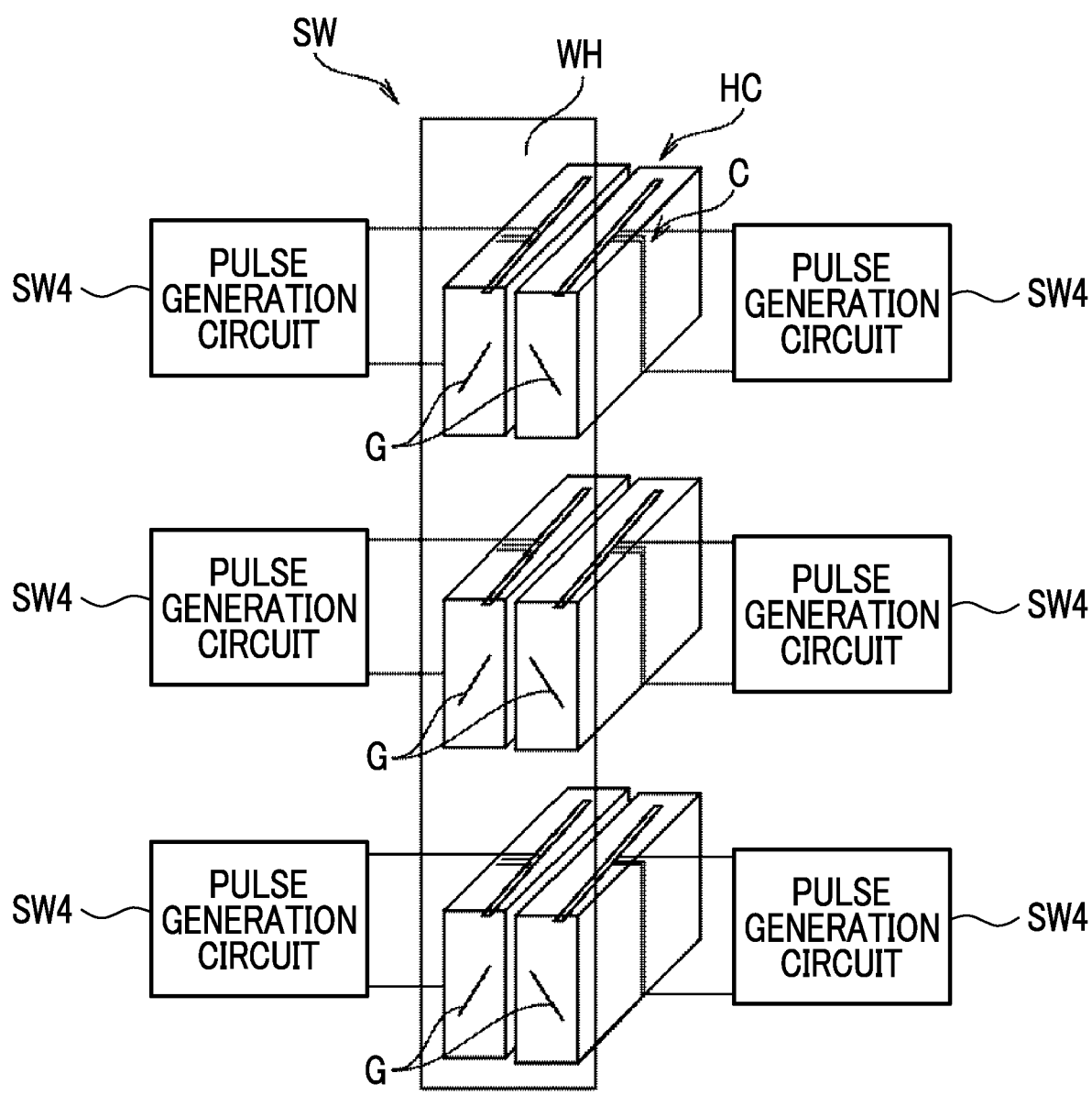
FIG. 13 is a view showing an example of a configuration of a servo writer according to the modification example.

For example, as shown in FIG. 12, the number of linear patterns of any of the first magnetization region SP1 and the second magnetization region SP2 of one servo pattern SP of each frame may be decreased. In FIG. 12, a case where the number of linear patterns of the second magnetization region SP2 of the first servo pattern SP of each frame is decreased is shown as an example. FIG. 13 shows an example of a configuration of a servo writer SW of this embodiment. The same reference numerals are used for constituent elements of 13 which are the same as the constituent elements of FIG. 6B and the description thereof is omitted.

As shown in FIG. 13, in the servo writer SW of this embodiment, the head core HC is independent in one linear pattern and the other linear pattern of the gap pattern G. In addition, each coil C is wound around each head core HC, and the pulse generation circuit SW4 which supplies the recording pulse current to each coil C is also independently provided. Therefore, it is possible to make the number of linear patterns different from each other between the first magnetization region SP1 and second magnetization region SP2 in the servo pattern SP.

In the embodiment, the case where the number of linear patterns except the linear pattern at the position of the leading portion and the linear pattern at the position of the tailing portion of the first magnetization region SP1 and the second magnetization region SP2 along the longitudinal direction is decreased has been described, but there is no limitation thereto. At least one of the linear pattern at the position of the leading portion or the linear pattern at the position of the tailing portion of the first magnetization region SP1 and the second magnetization region SP2 along the longitudinal direction may be removed.

In the embodiment, the case where one linear pattern is removed from the predetermined plural number of linear patterns has been described, but there is no limitation thereto. Two or more linear patterns may be removed from the predetermined plural number of linear patterns.

Figure 14:
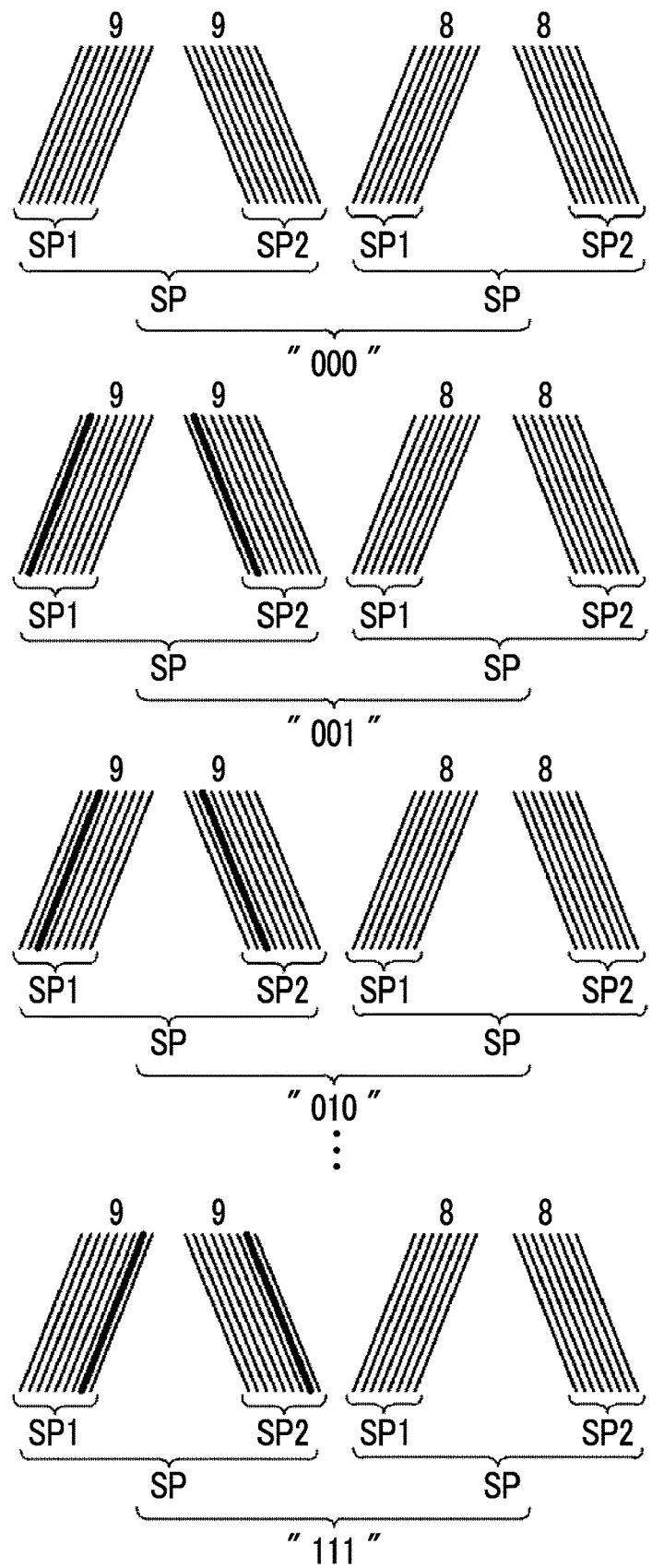
FIG. 14 is a view for describing an example of the method of embedding information in the servo band according to the modification example.

In the embodiment, a width of the linear pattern may be changed without removing the linear pattern. In this case, for example, as shown in FIG. 14, an aspect in which one linear pattern of each of the first magnetization region SP1 and the second magnetization region SP2 of the first servo pattern SP of the two servo patterns SP of each frame is formed to be thicker than other linear patterns is shown as an example. In addition, in this embodiment, an aspect in which the position of the linear pattern having a changed width is changed in accordance with information which is the embedding target is shown as an example. Further, this embodiment and the embodiment described above may be combined with each other.

Figure 15:
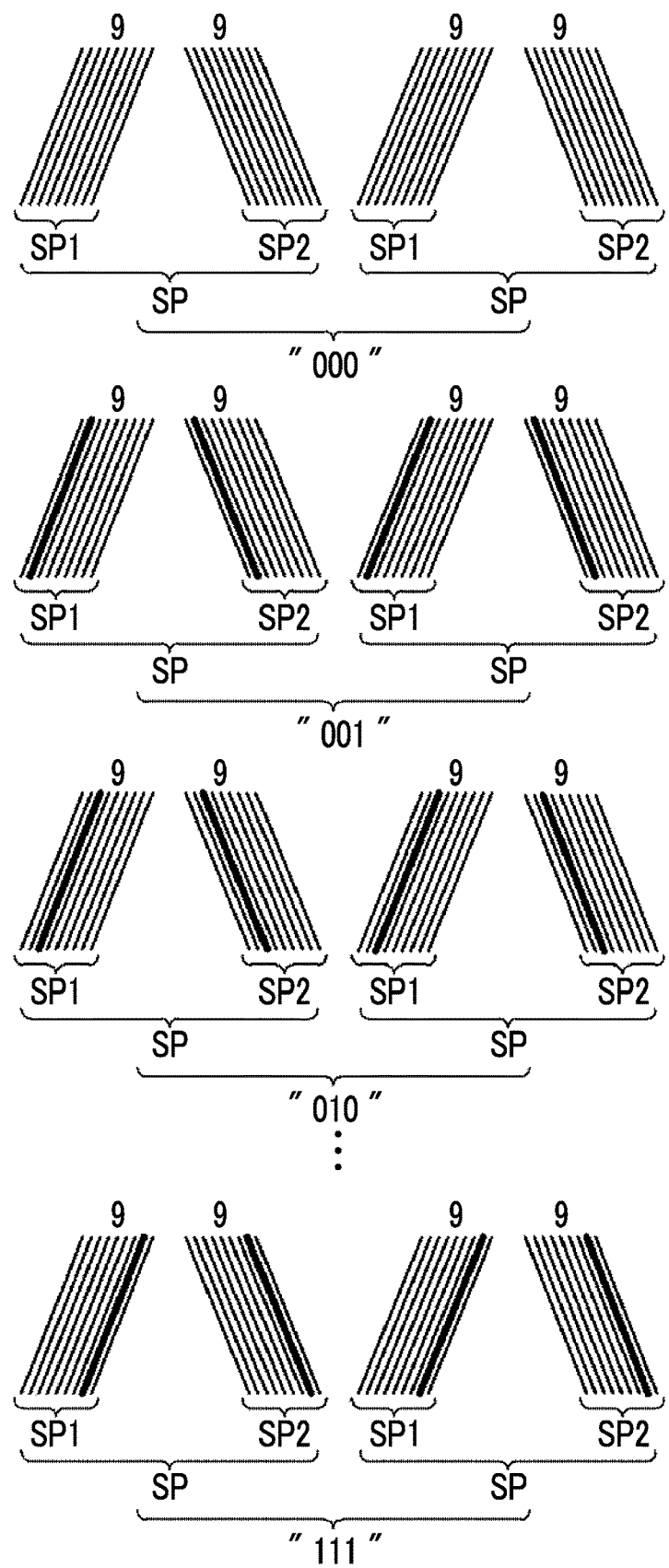
FIG. 15 is a view for describing an example of the method of embedding information in the servo band according to the modification example.
Figure 16:
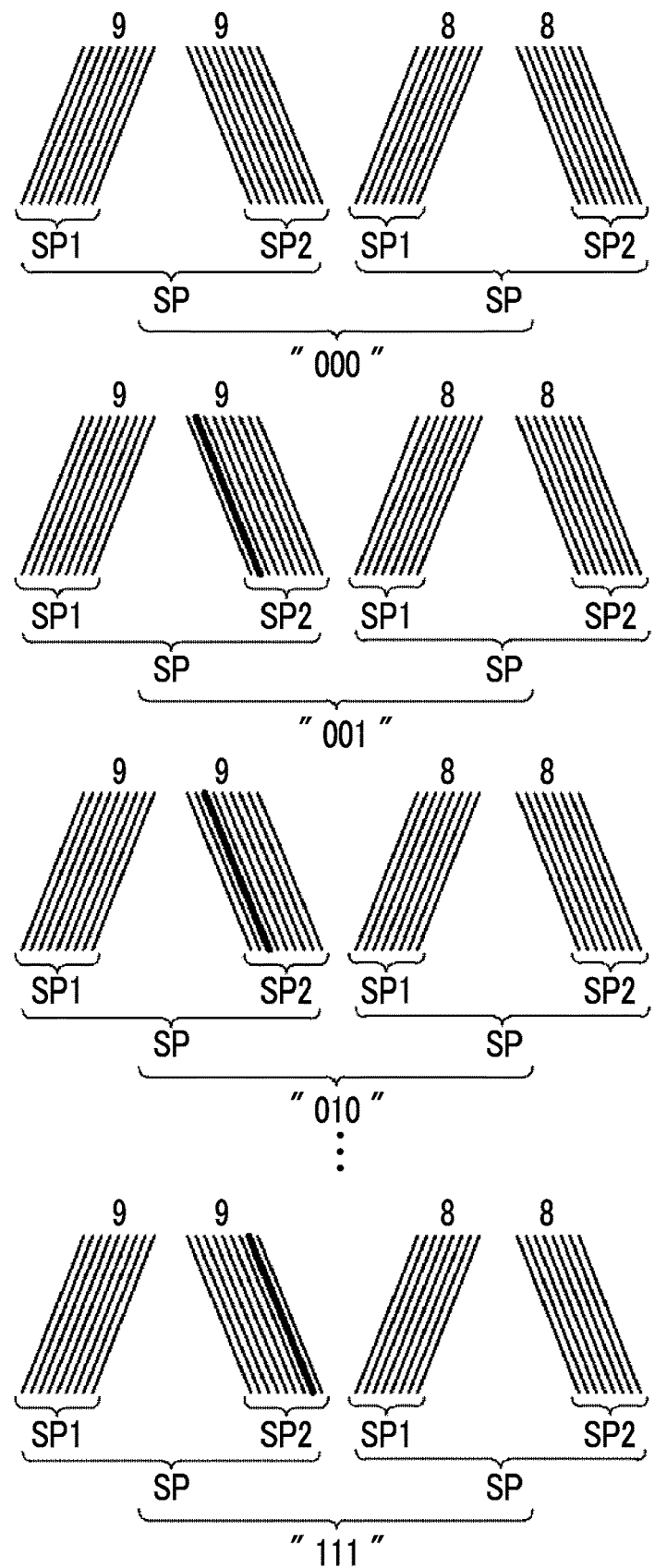
FIG. 16 is a view for describing an example of the method of embedding information in the servo band according to the modification example.

In this case, for example, as shown in FIG. 15, the width of the linear pattern of both servo patterns SP of each frame may be changed. In addition, in this case, for example, as shown in FIG. 16, the width of the linear pattern of any of the first magnetization region SP1 and the second magnetization region SP2 of one servo pattern SP of each frame may be changed. In FIG. 16, a case where the width of the linear pattern of the second magnetization region SP2 of the first servo pattern SP of each frame is changed is shown as an example.

In this case, the widths of the plural number of linear patterns may be changed. In addition, for example, the thickness of the linear pattern may not have 2 stages and may have three or more stages.

In this embodiment, in the step S22 of the recording and reproducing process, the control unit 14 specifies information embedded in the servo band SB, in accordance with the position of the linear pattern having a changed width of the servo pattern SP read by the process of the step S20. As an example shown in FIG. 17A, in a case where the width of the linear pattern is not changed, the first peak and the second peak are repeatedly detected at a predetermined time interval.

Figure 17A:
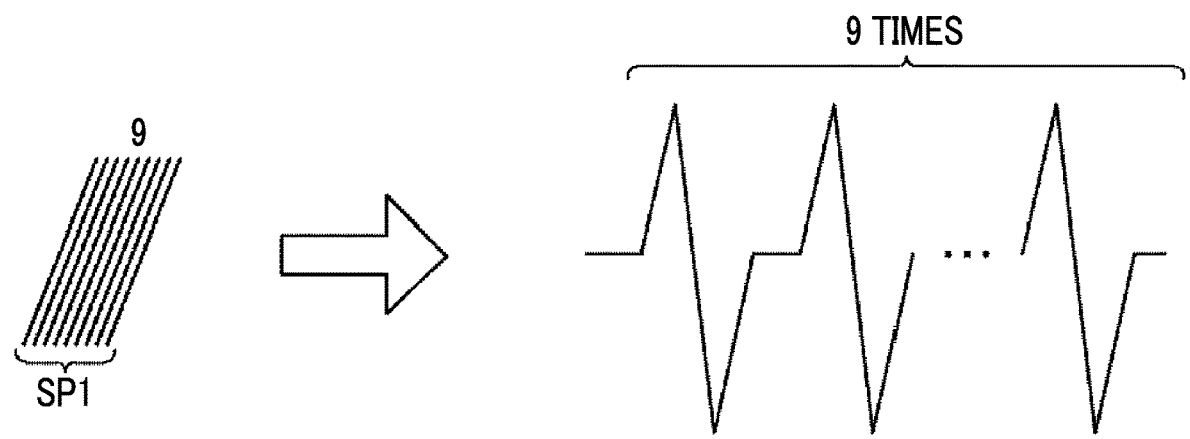
FIG. 17A is a view for describing a process of specifying information embedded in the servo band according to the modification example.
Figure 17B:
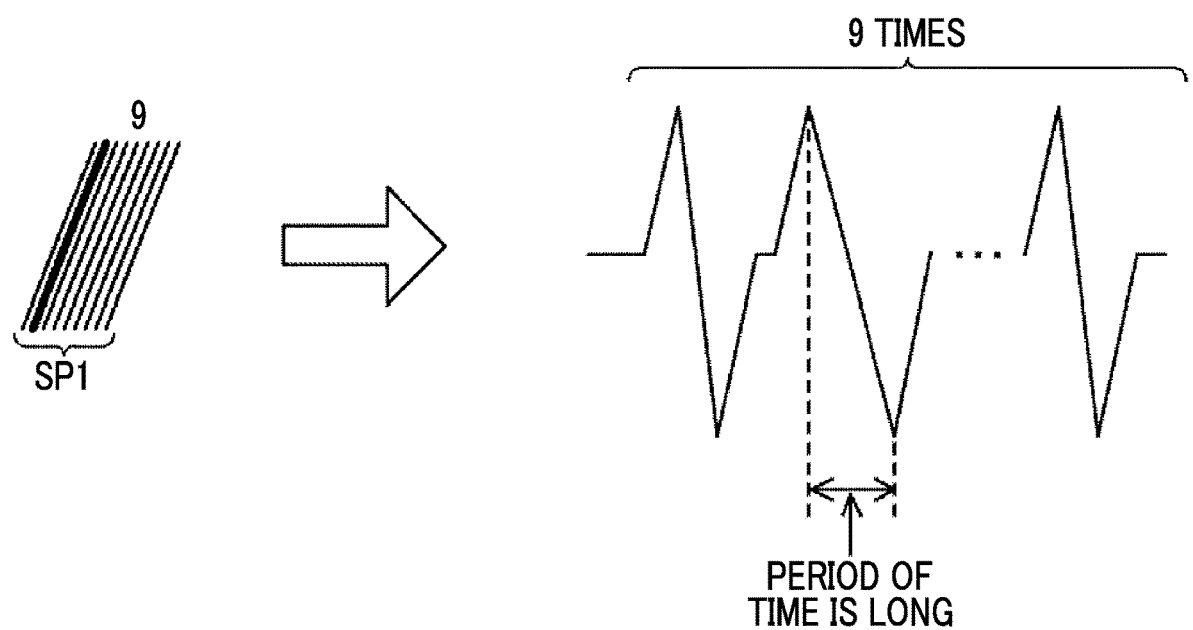
FIG. 17B is a view for describing the process of specifying information embedded in the servo band according to the modification example.

Meanwhile, as an example shown in FIG. 17B, in a case where the width of the linear pattern of the first magnetization region SP1 is changed, a period of time from the time when the first peak is detected to the time when the second peak is detected becomes longer than that of the other position, in accordance with the position of the linear pattern having a thickened width. In the example of FIG. 17B, the width of the second linear pattern from the leading portion is thickened, and accordingly, a period of time from the time when the second first peak is detected to the time when the second peak is detected becomes longer than that of the other position. In FIGS. 17A and 17B, the first magnetization region SP1 has been described as an example, but the same applies to the second magnetization region SP2.

Therefore, in this embodiment, the control unit 14 can specify information embedded in the servo band SB, by using the time interval from the time when the first peak is detected to the time when the second peak is detected, regarding each linear pattern of each magnetization region.

What is claimed is:

1. A magnetic tape comprising:
    a servo band on which servo patterns are repeatedly formed in a longitudinal direction thereof, each of the servo patterns including a first magnetization region formed to be tilted with respect to a width direction of the servo band by a predetermined angle along the width direction of the servo band, and a second magnetization region not parallel to the first magnetization region along the width direction of the servo band,
    wherein at least one of the first magnetization region or the second magnetization region is formed by decreasing the number of linear patterns from a predetermined plural number of linear patterns and changing a position of the linear pattern to be removed, in accordance with information that is an embedding target so that the information is embedded, and
    wherein the at least one of the first magnetization region or the second magnetization region is formed by decreasing the number of linear patterns from the plural number of the linear patterns except a linear pattern at a position of a tailing portion along the longitudinal direction to embed information.

2. A magnetic tape comprising:
    a servo band on which servo patterns are repeatedly formed in a longitudinal direction thereof, each of the servo patterns including a first magnetization region formed to be tilted with respect to a width direction of the servo band by a predetermined angle along the width direction of the servo band, and a second magnetization region not parallel to the first magnetization region along the width direction of the servo band,
    wherein at least one of the first magnetization region or the second magnetization region is formed by decreasing the number of linear patterns from a predetermined plural number of linear patterns and changing a position of the linear pattern to be removed, in accordance with information that is an embedding target so that the information is embedded, and
    wherein the at least one of the first magnetization region or the second magnetization region is formed by decreasing the number of linear patterns from the plural number of the linear patterns except a linear pattern at a position of a leading portion along the longitudinal direction, to embed the information.

3. The magnetic tape according to claim 2,
    wherein the at least one of the first magnetization region or the second magnetization region is formed by decreasing the number of linear patterns from the plural number of the linear patterns except a linear pattern at a position of a tailing portion along the longitudinal direction to embed information.

4. A manufacturing method of a magnetic tape including a servo band on which servo patterns are repeatedly formed in a longitudinal direction thereof, each of the servo patterns including a first magnetization region formed to be tilted with respect to a width direction of the servo band by a predetermined angle along the width direction of the servo band, and a second magnetization region not parallel to the first magnetization region along the width direction of the servo band, the method comprising:

forming at least one of the first magnetization region or the second magnetization region by decreasing the number of linear patterns from a predetermined plural number of linear patterns and changing a position of the linear pattern to be removed, in accordance with information that is an embedding target to embed the information, wherein the at least one of the first magnetization region or the second magnetization region is formed by decreasing the number of linear patterns from the plural number of the linear patterns except a linear pattern at a position of a tailing portion along the longitudinal direction to embed information.

5. A manufacturing device of a magnetic tape including a servo band on which servo patterns are repeatedly formed in a longitudinal direction thereof, each of the servo patterns including a first magnetization region formed to be tilted with respect to a width direction of the servo band by a predetermined angle along the width direction of the servo band, and a second magnetization region not parallel to the first magnetization region along the width direction of the servo band, the device comprising:

a servo recording element which embeds information by forming at least one of the first magnetization region or the second magnetization region by decreasing the number of linear patterns from a predetermined plural number of linear patterns and changing a position of the linear pattern to be removed, in accordance with the information which is an embedding target, wherein the at least one of the first magnetization region or the second magnetization region is formed by decreasing the number of linear patterns from the plural number of the linear patterns except a linear pattern at a position of a tailing portion along the longitudinal direction to embed information.

6. A recording and reproducing system of a magnetic tape including a servo band on which servo patterns are repeatedly formed in a longitudinal direction thereof, each of the servo patterns including a first magnetization region formed to be tilted with respect to a width direction of the servo band by a predetermined angle along the width direction of the servo band, and a second magnetization region not parallel to the first magnetization region along the width direction of the servo band, wherein information that is an embedding target is embedded on the magnetic tape by forming at least one of the first magnetization region or the second magnetization region by decreasing the number of linear patterns from a predetermined plural number of linear patterns and changing a position of the linear pattern to be removed, in accordance with the information, the system comprising:

a servo signal readout element which reads a servo pattern formed on the servo band of the magnetic tape; and a specification unit which specifies the embedded information in accordance with the number of linear patterns of the servo pattern read by the servo signal readout element and the position of the removed linear pattern.

7. A magnetic tape comprising:

a servo band on which servo patterns are repeatedly formed in a longitudinal direction thereof, each of the servo patterns including a first magnetization region formed to be tilted with respect to a width direction of a servo band by a predetermined angle along the width direction of the servo band, and a second magnetization region not parallel to the first magnetization region along the width direction of the servo band, wherein at least one of the first magnetization region or the second magnetization region is formed by changing a width of at least one linear pattern of a predetermined plural number of linear patterns to be different from the other linear patterns and changing a position of the linear pattern having a width to be changed, in accordance with information that is an embedding target so that the information is embedded.

8. A manufacturing method of a magnetic tape including a servo band on which servo patterns are repeatedly formed in a longitudinal direction thereof, each of the servo patterns including a first magnetization region formed to be tilted with respect to a width direction of a servo band by a predetermined angle along the width direction of the servo band, and a second magnetization region not parallel to the first magnetization region along the width direction of the servo band, the method comprising:

forming at least one of the first magnetization region or the second magnetization region by changing a width of at least one linear pattern of a predetermined plural number of linear patterns to be different from the other linear patterns and changing a position of the linear pattern having a width to be changed, in accordance with information which is an embedding target to embed the information.

9. A manufacturing device of a magnetic tape including a servo band on which servo patterns are repeatedly formed in a longitudinal direction thereof, each of the servo patterns including a first magnetization region formed to be tilted with respect to a width direction of the servo band by a predetermined angle along the width direction of the servo band, and a second magnetization region not parallel to the first magnetization region along the width direction of the servo band, the device comprising:

a servo recording element which embeds information by forming at least one of the first magnetization region or the second magnetization region by changing a width of at least one linear pattern of a predetermined plural number of linear patterns to be different from the other linear patterns and changing a position of the linear pattern having a width to be changed, in accordance with the information which is an embedding target.

10. A recording and reproducing system of a magnetic tape including a servo band on which servo patterns are repeatedly formed in a longitudinal direction thereof, each of the servo patterns including a first magnetization region formed to be tilted with respect to a width direction of the servo band by a predetermined angle along the width direction of the servo band, and a second magnetization region not parallel to the first magnetization region along the width direction of the servo band, and information that is an embedding target is embedded on the magnetic tape by forming at least one of the first magnetization region or the second magnetization region by changing a width of at least one linear pattern of a predetermined plural number of linear patterns to be different from the other linear patterns and changing a position of the linear pattern having a width to be changed, in accordance with the information, the system comprising:

a servo signal readout element which reads a servo pattern formed on the servo band of the magnetic tape; and a specification unit which specifies the embedded information in accordance with the position of the linear pattern having the changed width of the servo pattern read by the servo signal readout element.

11. A manufacturing method of a magnetic tape including a servo band on which servo patterns are repeatedly formed in a longitudinal direction thereof, each of the servo patterns including a first magnetization region formed to be tilted with respect to a width direction of the servo band by a predetermined angle along the width direction of the servo band, and a second magnetization region not parallel to the first magnetization region along the width direction of the servo band, the method comprising:

forming at least one of the first magnetization region or the second magnetization region by decreasing the number of linear patterns from a predetermined plural number of linear patterns and changing a position of the linear pattern to be removed, in accordance with information that is an embedding target to embed the information, wherein the at least one of the first magnetization region or the second magnetization region is formed by decreasing the number of linear patterns from the plural number of the linear patterns except a linear pattern at a position of a leading portion along the longitudinal direction, to embed the information.

12. The manufacturing method according to claim 11, wherein the at least one of the first magnetization region or the second magnetization region is formed by decreasing the number of linear patterns from the plural number of the linear patterns except a linear pattern at a position of a tailing portion along the longitudinal direction to embed information.

13. A manufacturing device of a magnetic tape including a servo band on which servo patterns are repeatedly formed in a longitudinal direction thereof, each of the servo patterns including a first magnetization region formed to be tilted with respect to a width direction of the servo band by a predetermined angle along the width direction of the servo band, and a second magnetization region not parallel to the first magnetization region along the width direction of the servo band, the device comprising:

a servo recording element which embeds information by forming at least one of the first magnetization region or the second magnetization region by decreasing the number of linear patterns from a predetermined plural number of linear patterns and changing a position of the linear pattern to be removed, in accordance with the information which is an embedding target, wherein the at least one of the first magnetization region or the second magnetization region is formed by decreasing the number of linear patterns from the plural number of the linear patterns except a linear pattern at a position of a leading portion along the longitudinal direction, to embed the information.

14. The manufacturing device according to claim 13, wherein the at least one of the first magnetization region or the second magnetization region is formed by decreasing the number of linear patterns from the plural number of the linear patterns except a linear pattern at a position of a tailing portion along the longitudinal direction to embed information.

* * * * *